United States Patent Office 2,802,110
Patented Aug. 6, 1957

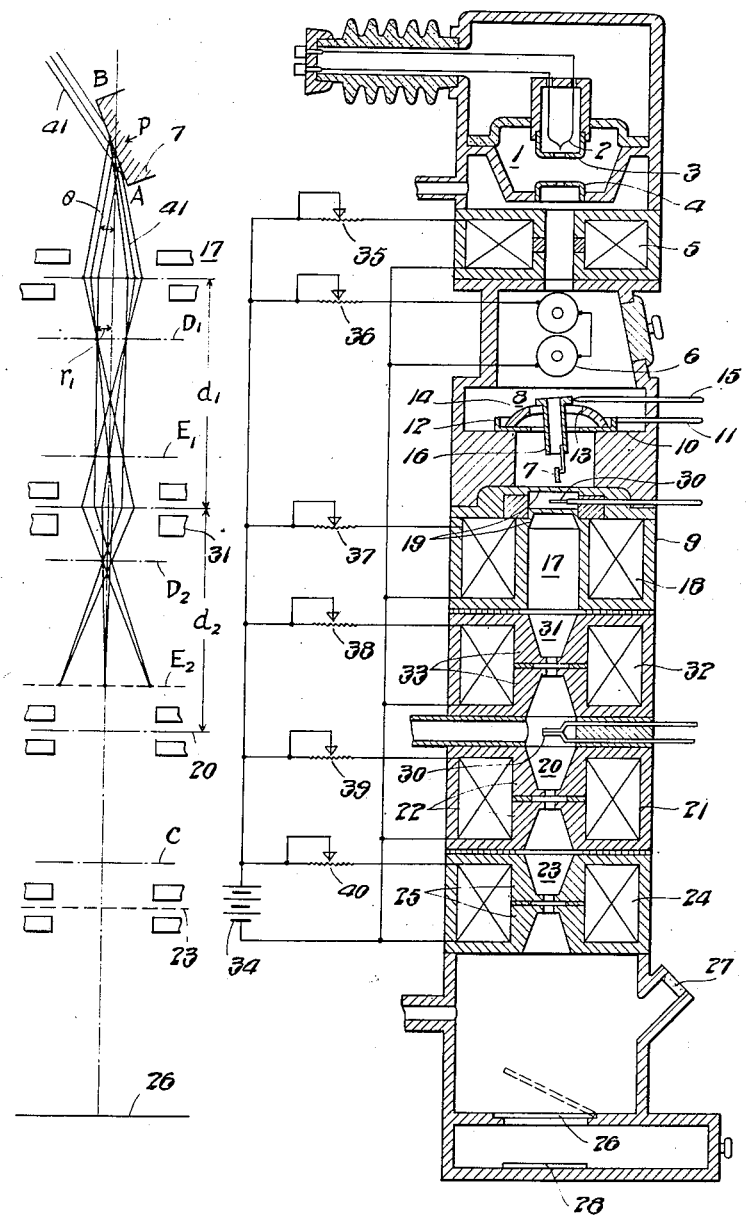

2,802,110

ELECTRON MICROSCOPE

Kenji Kazato, Musashino-shi, and Kazuo Ito, Nakano-ku, Tokyo, Japan

Application July 27, 1954, Serial No. 446,125

Claims priority, application Japan September 4, 1953

3 Claims. (Cl. 250—49.5)

This invention relates to an electron microscope, and more particularly to an electron microscope which is provided with a lens system including a first objective lens and a second objective one.

In a heretofore known electron microscope of a three stage lens system having an objective, intermediate and projector lenses, attempts to obtain a microscopic image and a diffraction pattern by an electron beam reflected from a specimen which is so inclined with respect to the axis of the lenses that every region of the specimen surface lies at different distance from the objective, always encounter the following problem. It is inevitable in employing an ordinary electron microscope that the microscopic image is reduced in magnification and the diffraction pattern is increased in magnitude when the specimen surface region which is far from the objective is imaged, whereas the former image becomes greater and the latter pattern becomes smaller when the other specimen surface region which is close by the objective is imaged.

Accordingly, the magnification of the microscopic image and the magnitude of the diffraction pattern are changed in inverse tendency with varying distance between the specimen surface region in question and the objective. Owing to the above reason, an ordinary electron microscope can not be so adjusted that the magnification of the microscopic image and the magnitude of the diffraction pattern are brought to a desired constant value with regard to the specimen surface regions which are set apart from the objective in different distances.

When obtaining an electron microscopic image with the electron beam passing through a specimen, during examination of the microscopic image of the specimen being subjected to heating, the specimen should be disposed at considerably further distance from the objective than in the case of no heating. If heating takes place, it will be almost impossible in an ordinary electron microscope to bring the magnification of the microscopic image and the magnitude of the diffraction pattern to any desired constant value.

It frequently occurred in a reflection type electron microscope that the position of the specimen must be sufficiently separated from the objective. Particularly since it is frequently necessary to rotate, move to and fro or heat the specimen in order to photograph it or to examine the images and the patterns of the specimen in various conditions.

The chief object of this invention is to provide an electron microscope which is capable of imparting a desired constant magnitude to the microscopic image and the diffraction pattern of the specimen regions which are different in distance from the objective, when employed as a reflection type electron microscope.

Another object of this invention is to provide an electron microscope which makes it possible to obtain the microscopic image and the diffraction pattern of any desired magnitude in a case in which the specimen is very far from the objective as compared with an ordinary electron microscope.

Further object of this invention is to provide an electron microscope having a lens system which can be adjusted so as to obtain the microscopic image and the diffraction pattern of substantially the same desired magnitude, notwithstanding the different distances between the specimen and the objective.

In accordance with this invention, between the first objective lens and the intermediate lens is disposed a second objective lens and means are provided for respectively adjusting the focal lengths of the first and the second objective lenses, the adjustment being so made that the product of the focal length of the first objective lens and that of the second objective lens is substantially constant, thereby obtaining the microscopic image and the diffraction pattern of substantially constant magnitude. For this purpose, in an electron microscope having electromagnetic lenses, a plurality of variable resistors is provided, which are respectively connected to the first and the second objective lens coils in series or in parallel, each of which is energized through the respective variable resistor from a common or an individual direct current source. The amount of the current passing through each lens coil, and accordingly the focal length of each objective lens are changed by adjusting the respective variable resistor.

Besides the aforesaid first objective, second objective and intermediate lenses, this electron microscope is also provided with a projector lens. In order to obtain not only the microscopic image and the diffraction pattern if the microscope is to be used as the transmission type electron microscope and also as the diffraction type one, the present electron microscope has two pairs of deflection coils between the first objective lens and the focusing lens for deflecting the electron beam so that it can strike the specimen at any desired angle. A specimen holder is so constructed that a specimen is replaceable by another so as to be adapted for the transmission or the reflection type. It is obvious that the electron microscope according to this invention is also provided with parts, such as an electron gun assembly from which the electron beam is emitted, a physical aperture and the like, which must conventionally be attached thereto.

This invention will be more clearly understood by reference to the attached drawing, showing by way of example, one embodiment thereof.

Referring to the drawing:

Fig. 1 is a vertical sectional view of an electron microscope embodying this invention, showing electrical circuits including variable resistors for adjusting amount of currents passing through many lens coils being connected, Fig. 2 is an explanatory diagram for understanding the operation of an electron microscope according to this invention, the same reference characters being used to designate similar main parts of the electron microscope shown in Fig. 1.

Referring to Fig. 1, 1 represents an electron gun assembly comprising a filament 2 and a grid 3. 4 is an anode; 5 a focusing lens coil and 6 a pair of deflection coils. 7 designates a specimen mounted on a specimen holder 8. The holder 8 is composed of a dish shaped member 12 which is slidably mounted on the upper surface 10 of a collar formed in a microscopic column 9 so as to be moved by means of an operating rod 15 from the outside of the vacuum, a semi-spherical member 14 secured to the dish shaped member 12 and a tubular member 16 which is inserted through a guiding groove 13 formed in the semi-spherical member 14 so as to be rotated about the center of the specimen by means of another operating rod 15 from the outside of the vacuum, the specimen being removably attached to the lower end of the tubular member. 17 is an objective lens having a coil 18 and pole pieces 19. 20 is an intermediate lens having a coil 21 and pole pieces 22. 23 represents a projector lens having a coil 24 and pole pieces 25. 26 is a fluorescent screen; 27 a port; 28 a photographic plate and 30 a physical aperture for limiting the electron beam.

In accordance with this invention, a second objective lens 31 having a coil 32 and pole pieces 33 is interposed between the objective lens 17 and the intermediate lens 20. Accordingly, a lens system composed of the first objective lens 17, the second objective lens 31, the intermediate lens 20 and the projector lens 23 which are disposed, stage by stage, along the advance direction of the electron beam is formed. In order to adjust the amount of the current passing through each of said coils, a common direct current source 34 is connected across the terminals of each of said coils through the respective variable resistor. Namely, the terminals of the focusing lens coil 5, the deflection coil 6, the first objective lens coil 18, the second objective lens coil 32, the intermediate lens coil 21 and the projector lens coil 24 are respectively connected in parallel to both electrodes of the direct current source 34, the variable resistors 35 to 40, inclusive, being inserted in series with the coils 5, 6, 18, 32, 21 and 24 respectively.

The operation of the above electron microscope according to this invention is as follows:

As shown in Figure 2, the specimen 7 is inclined at about 4° to the axis of the lenses and the electron beam 41 is inclined at about 8° to the axis by means of the deflecting coils 6 to strike the surface area P of the specimen 7. The region of about 50μ in diameter is precisely focused with the reflected beam owing to the great depth of field of the electron microscope, the image being made by adjusting the first objective lens 17. This image appears in the image plane $E_1$ of the first objective lens 17, the magnification of which is given by the following formula:

$$M_1 = \frac{d_1}{f_1}$$

where $d_1$ is the distance between the first and the second lenses and $f_1$ the focal length of the objective lens necessary to produce the microscopic image in observation.

Next, the specimen is so readjusted that it becomes substantially parallel to the axis and at the same time the deflecting angle of the beam to the axis is decreased by adjusting the current passing through the deflection coil. Then a diffraction pattern of the specimen is built in the back focal plane $D_1$ of the first objective lens. The magnitude of the diffraction pattern, that is, the distance $r_1$ between the central spot and the diffraction point will be:

$$r_1 = f_1 \theta$$

where $\theta$ is Bragg's angle.

The first diffraction pattern produced in the back focal plane and the first intermediate image in the image plane of the first objective lens are simultaneously magnified by the second objective lens 31 to produce the second diffraction pattern in the second back focal plane $D_2$ of the lens 31 and the second microscopic image in the second image plane $E_2$ of the same lens 31 respectively. The magnitude $r_2$ of the second diffraction pattern and the magnification $M_2$ of the second microscopic image are respectively given by the following formulae:

$$r_2 = f_1 \theta \times f_2 / d_1$$
$$M_2 = d_1/f_1 \times d_2/f_2$$

where $d_2$ is the distance between the second objective lens 31 and the intermediate lens 20, and $f_2$ the focal length of the second objective lens.

It is necessary, in turn, to adjust the focal length of the intermediate lens to obtain the magnified pattern or the image in the third image plane C of the intermediate lens corresponding to either the second diffraction pattern or the second microscopic image. In this case, the magnitude $r_3$ of the third diffraction pattern is given by, $$r_3 = f_1 \theta \times f_2 / d_1 \times M_i$$

and the magnification $M_3$ of the third microscopic image, $$M_3 = d_1/f_1 \times d_2 \times M_j$$

$M_i$ and $M_j$ being the magnifications of the intermediate lens in the respective case and determined by the arrangement of the physical aperture. The third pattern and the image thus obtained are further magnified by the projector lens 23 respectively to focus the last pattern and the image onto the fluorescent screen 26, the magnitude $r_4$ of the former pattern and the magnification $M_4$ of the latter image being respectively expressed by:

$$r_4 = f_1 \theta \times f_2 / d_1 \times M_i \times M_p$$
$$M_4 = d_1/f_1 \times d_2/f_2 \times M_j \times M_p$$

where $M_p$ represents the magnification of the projector lens. The above formulae are established under the assumption that $$d_1, d_2 \gg f_1, f_2$$

and this assumption will always be applicable for almost all the electron microscopes.

The above consideration is taken in the diffraction pattern and microscopic image regarding to a certain narrow region such as area P. But, in a reflection type electron microscope, the specimen is arranged at a small angle to the lens axis so that the difference in distance between the region A which is nearby the objective lens and the region B which lies far therefrom is considerably greater as compared with the depth of focus. For the purpose of obtaining the pattern or the image corresponding to the regions A and B which are different in distance from the objective lens, these regions must be imaged by respectively adjusting the focal length $f_1$ of the objective lens according to their respective distances.

Considering the general case, the magnitude $r_4$ of the diffraction pattern is proportional to the focal length $f_1$, whereas the magnification $M_4$ of the microscopic image is inversely proportional thereto as clearly shown by the last two formulae above described. Accordingly, in a three stage electron microscope heretofore known which has one objective lens only, it is obvious that the diffraction pattern and the microscopic image of the same in any desired magnification can never be obtained by adjusting the focal length $f_1$ only.

According to this invention, however, we find the following relations:

$$r_4 \propto f_1 \times f_2$$

$$M_4 \propto \frac{1}{f_1 \times f_2}$$

from the last two formulae based upon the arrangement of the second objective relative to the other parts. Accordingly, the variable resistor 37 for the first objective lens 17 and the variable resistor 38 for the second objective 31, as shown in Fig. 1, can be so adjusted respectively that $f_1 \times f_2$ in the above formulae becomes substantially constant, with the result that $r_4$ and $M_4$ are substantially the same in value. Namely, according to this invention, the magnitudes of the diffraction pattern and the microscopic image can be equalized to any desired constant magnitude by using one and the same electron microscope.

Hence, it will be understood that according to the present invention, we can adjust the product of the focal lengths of the first and the second objective lenses to be substantially constant corresponding to the differences in distance between the specimen and the first objective lens, thereby obtaining the diffraction and the microscopic image of substantially the same magnitude, even though the specimen may be set at any desired position which is considerably far from the first objective lens. This advantage of this invention can be obtained in the transmission type electron microscopes as well as in the reflection type ones.

What is claimed is:

1. An electron microscope comprising a lens system composed of a first objective lens, a second objective lens, an intermediate lens and a projector lens, said lenses being disposed, stage by stage, along the advance direction of the electron beam, said lenses comprising independent pole pieces and electro-magnetic coils wound thereon, direct current sources for said coils, connecting means for connecting said electro-magnetic coils of said lenses to their respective direct current sources, said lenses being corelated for observing an electron microscopic image and a diffraction pattern, current adjusting means for adjusting respectively the exciting current passing through respective electro-magnetic coils of at least the first mentioned three lenses, said first and second objective lenses being so adjusted by said current adjusting means that the product of their focal lengths is maintained substantially constant so as to respectively obtain substantially the same electron microscopic image and a diffraction pattern in any desired magnitude with regard to a specimen which can be set at different positions from said first objective lens, said intermediate lens being controlled to produce the image of either said electron microscopic image or said diffraction pattern, which are kept at constant magnitude, on a constant plane between said intermediate lens and projector lens, and the last mentioned microscopic image and diffraction pattern of the same magnitude being respectively magnified by said projector lens.

2. An electron microscope as claimed in claim 1, wherein said current adjusting means consist of an electric circuit including a variable resistor, and said electro-magnetic coil of said first objective lens, an electric circuit including a resistor and said electro-magnetic coil of said second objective lens and an electric circuit including a third resistor and said electro-magnetic coil of said intermediate lens, said first two resistors being respectively so adjusted that substantially the same electron microscopic image and a diffraction pattern of any desired magnitude are obtained with regard to a specimen which is set at any desired distance from said first objective lens.

3. An electron microscope as claimed in claim 2, wherein said resistors are connected in series with the respective electro-magnetic coils of said first and second objective lenses and said intermediate lens.

References Cited in the file of this patent

UNITED STATES PATENTS

| 2,422,807 | Smith | June 24, 1947 |
| 2,494,442 | Poole | Jan. 10, 1950 |
| 2,586,559 | Page | Feb. 19, 1952 |
| 2,688,091 | Tadano et al. | Aug. 31, 1954 |
| 2,688,092 | Tadano et al. | Aug. 31, 1954 |

FOREIGN PATENTS

| 705,867 | Great Britain | Mar. 17, 1954 |